United States Patent

Dianetti et al.

[11] 4,158,475
[45] Jun. 19, 1979

[54] OPTICAL SYSTEM FOR INVERTED MICROSCOPES

[75] Inventors: Joseph C. Dianetti, East Aurora; Edward B. Rybicki, Depew, both of N.Y.

[73] Assignee: American Optical Corporation, Southbridge, Mass.

[21] Appl. No.: 897,451

[22] Filed: Apr. 18, 1978

[51] Int. Cl.² ............................................. G02B 23/02
[52] U.S. Cl. .................................................... 350/50
[58] Field of Search ....................... 350/50, 51, 53, 54

[56] References Cited

U.S. PATENT DOCUMENTS 4,043,633  8/1977  Park et al. ............................. 350/54

Primary Examiner—Jon W. Henry
Attorney, Agent, or Firm—Jeremiah J. Duggan; Alan H. Spencer; Stephen Schneeberger

[57] ABSTRACT

A pair of identical bi-convex triplets, a mirror, and a pentaprism are used to extend the parallel light zone between the objective and the telescope lens of a conventional infinity corrected microscope system. Specific values for the components and spacings between the same are given.

1 Claim, 1 Drawing Figure

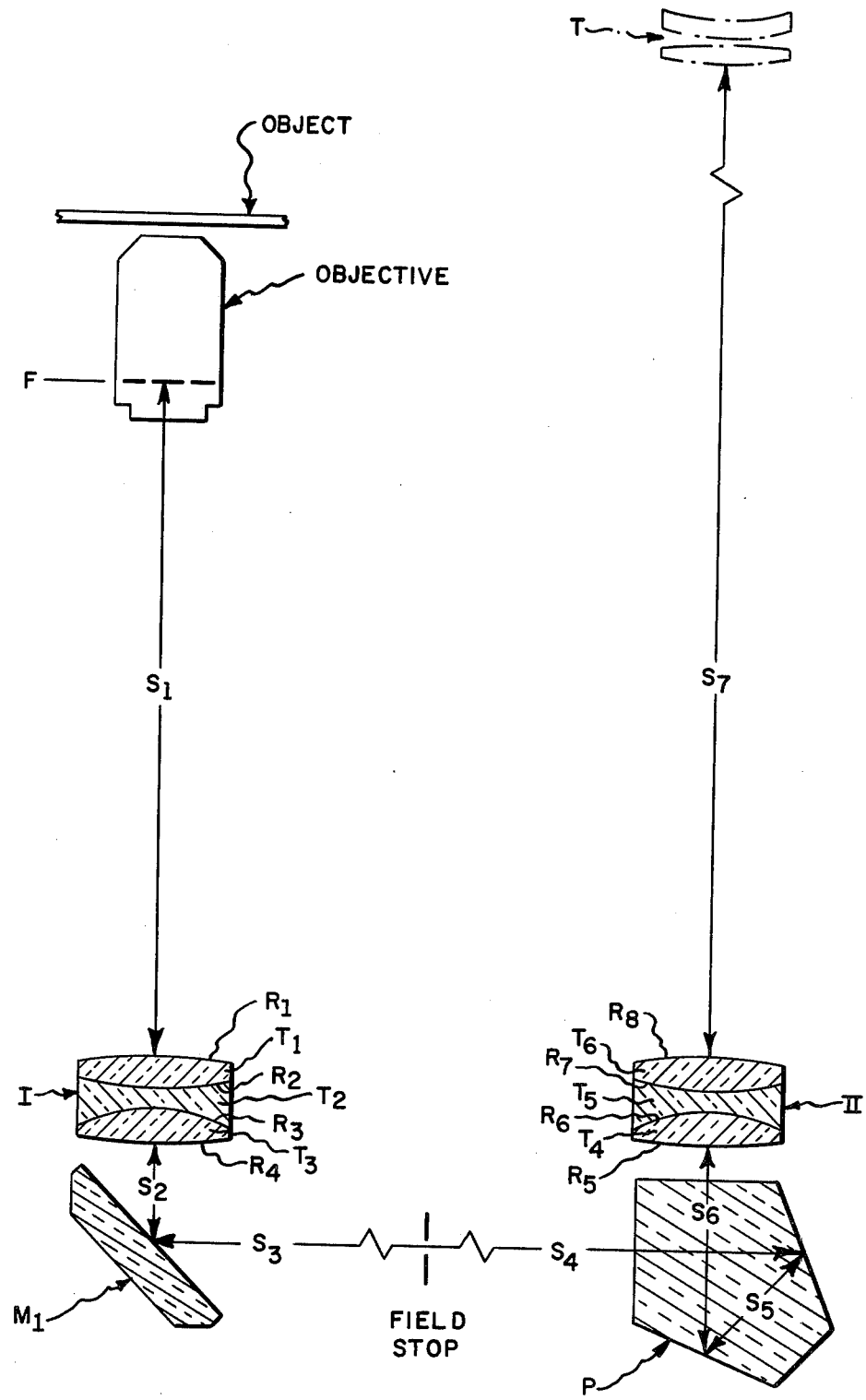

OPTICAL SYSTEM FOR INVERTED MICROSCOPES

BACKGROUND OF THE INVENTION

The present invention relates to microscope optical systems and more particularly to such systems for inverted, infinity-corrected microscopes.

It is sometimes desirable to observe objects through a microscope from the bottom rather than in the conventional manner, from the top. One example of such a microscope is the tissue-culture microscope which is used to examine specimens in a fluid carried by a container. The container is set on the stage and the specimen is observed through the container bottom. It is usually necessary to examine such specimens from the bottom because containers such as flasks and beakers do not permit movement of the objective and/or nosepiece of a conventional microscope within the necessary close proximity to the specimen being observed. However, when the nosepiece containing the objective is inverted and approaches the specimen from the bottom through a hole in the stage, the objective may be brought as close to the container surface as desired. It is highly desirable to use conventional eyepiece units and nosepiece-objective units to provide the maximum interchangeability of components with conventional microscopes.

PRIOR ART

The most pertinent prior art known to the applicant is U.S. Pat. No. 4,043,633 issued to Park and Dianetti Aug. 23, 1977. The Park andd Dianetti patent discloses an optical relay for an infinity corrected microscopes system which permits positioning optical elements at a station equivalent to the back focal plane of the objective. The microscope system is conventional for viewing an object from the top and contains four reflective surfaces to divert the light to a conventional telescope lens.

SUMMARY OF THE INVENTION AND BRIEF DESCRIPTION OF THE DRAWINGS

A pair of bi-convex triplets in conjunction with a reflective surface and pentaprism are used to present light from the inverted microscope objective to a conventionally positioned microscope body having a telescope lens. The pentaprism is used to present the image in the same orientation as the object being viewed.

The drawing is an optical diagram of the system according to the present ivention.

DETAILED DESCRIPTION OF THE INVENTION

Referring to the drawing a microscope objective has a back focal plane F. Triplet I, mirror Ml, pentaprism P and triplet II present parallel light from the objective to telescope lens T. The values of the lens components and spacings are presented in the Table. Pentaprism P is made of glass having an index of refraction of 1.523 and an Abbe number of 58.6. Triplets I and II have identical lens elements but are arranged with the opposite axial orientation. The parameters of the triplets and the spacing between the various optical elements are given in the following Table with axial spacings being designated $S_1$ to $S_7$, lens radii being designated $R_1$ to $R_8$, wherein a minus sign applied to surfaces whose center of curvature lies on the object side of their vertices, and lens thicknesses are designed $T_1$ to $T_6$. All radii, spacings and thicknesses are in millimeters. The refractive indicies and Abbe numbers of the glasses in the successive lenses are designated $ND_1$ to $ND_6$ and $\nu_1$ to $\nu_6$ respectively.

TABLE

| Lens | Radius R | Thickness T | Spacing S | Refractive Index ND | Abbe Number |
|---|---|---|---|---|---|
|  |  |  | $S_1 = 118.9$ |  |  |
|  | $R_1 = 85.285$ |  |  |  |  |
|  |  | $T_1 = 6.0$ |  | $ND_1 = 1.504$ | $\nu_1 = 66.9$ |
|  | $R_2 = -52.24$ |  |  |  |  |
| I |  | $T_2 = 3.2$ |  | $ND_2 = 1.613$ | $\nu_2 = 44.3$ |
|  | $R_3 = 31.84$ |  |  |  |  |
|  |  | $T_3 = 6.0$ |  | $ND_3 = 1.589$ | $\nu_3 = 48.7$ |
|  | $R_4 = -113.24$ |  |  |  |  |
|  |  |  | $S_2 = 17.2$ |  |  |
|  |  |  | $S_3 = 101.0$ |  |  |
|  |  |  | $S_4 = 87.9*$ |  |  |
|  |  |  | $S_5 = 17.1**$ |  |  |
|  |  |  | $S_6 = 26.3*$ |  |  |
|  | $R_5 = 113.24$ |  |  |  |  |
|  |  | $T_4 = 6.0$ |  | $ND_4 = 1.589$ | $\nu_3 = 48.7$ |
|  | $R_6 = -31.84$ |  |  |  |  |
| II |  | $T_5 = 3.2$ |  | $ND_5 = 1.613$ | $\nu_5 = 44.3$ |
|  | $R_7 = 52.24$ |  |  |  |  |
|  |  | $T_6 = 6.0$ |  | $ND_6 = 1.504$ | $\nu_6 = 66.9$ |
|  | $R_8 = -85.285$ |  |  |  |  |
|  |  |  | $S_7 = 213.6$ |  |  |

*Optical distance ( $\frac{\text{geometric prism distance}}{ND}$ or $\frac{31.385}{1.523}$ )

**Optical distance ( $\frac{\text{geometric prism distance}}{ND}$ or $\frac{26.000}{1.523}$ )

What is claimed is:

1. An optical system for extending the distance between a conventional infinity-corrective microscope objective and a telescope lens, which comprise a pair of bi-convex triplets, a mirror, and a pentaprism having the parameters set forth below where lens radii ($R_1$-$R_8$), a minus sign (−) indicates the center curvature on the back focal plane side of the surface vertex, lens thicknesses ($T_1$-$T_6$), axial spacings along the optical axis of the system ($S_1$-$S_7$), refractive indicies ($ND_1$-$ND_6$), and Abbe numbers ($\nu_1$-$\nu_6$) are determined by the following relationship, all radii, thicknesses and spacings being in millimeters.

| Lens | Radius R | Thickness T | Spacing S | Refractive Index ND | Abbe Number $\nu$ |
|---|---|---|---|---|---|
|  |  |  | $S_1 = 118.9$ |  |  |
|  | $R_1 = 85.285$ |  |  |  |  |
|  |  | $T_1 = 6.0$ |  | $ND_1 = 1.504$ | $\nu_1 = 66.9$ |
|  | $R_2 = -52.24$ |  |  |  |  |
| I |  | $T_2 = 3.2$ |  | $ND_2 = 1.613$ | $\nu_2 = 44.3$ |
|  | $R_3 = 31.84$ |  |  |  |  |
|  |  | $T_3 = 6.0$ |  | $ND_3 = 1.589$ | $\nu_3 = 48.7$ |
|  | $R_4 = -113.24$ |  |  |  |  |
|  |  |  | $S_2 = 17.2$ |  |  |
|  |  |  | $S_3 = 101.0$ |  |  |
|  |  |  | $S_4 = 87.9*$ |  |  |
|  |  |  | $S_5 = 17.1**$ |  |  |
|  |  |  | $S_6 = 26.3*$ |  |  |
|  | $R_5 = 113.24$ |  |  |  |  |
|  |  | $T_4 = 6.0$ |  | $ND_4 = 1.589$ | $\nu_3 = 48.7$ |
|  | $R_6 = -31.84$ |  |  |  |  |
| II |  | $T_5 = 3.2$ |  | $ND_5 = 1.613$ | $\nu_5 = 44.3$ |
|  | $R_7 = 52.24$ |  |  |  |  |
|  |  | $T_6 = 6.0$ |  | $ND_6 = 1.504$ | $\nu_6 = 66.9$ |
|  | $R_8 = -85.285$ |  |  |  |  |
|  |  |  | $S_7 = 213.6$ |  |  |

*Optical distance ( $\frac{\text{geometric prism distance}}{ND}$ or $\frac{31.385}{1.523}$ )

**Optical distance ( $\frac{\text{geometric prism distance}}{ND}$ or $\frac{26.000}{1.523}$ )

* * * * *